(12) United States Patent
Miyajima et al.

(10) Patent No.: US 6,397,884 B1
(45) Date of Patent: Jun. 4, 2002

(54) CONNECTION STRUCTURE AND VALVED CONNECTION MEMBER

(75) Inventors: Atsuo Miyajima, Inuyama; Tomohide Ito, Kasugai, both of (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/960,331

(22) Filed: Sep. 24, 2001

(30) Foreign Application Priority Data

Sep. 25, 2000 (JP) ........................................ 2000-290172
Aug. 3, 2001 (JP) ........................................ 2001-237012

(51) Int. Cl.$^7$ ............................................. F16K 15/02
(52) U.S. Cl. ................... 137/543.23; 251/149.6
(58) Field of Search ................... 137/543.23, 515.5; 251/149.6, 149.1; 285/319

(56) References Cited

U.S. PATENT DOCUMENTS

| | | | | |
|---|---|---|---|---|
| 2,912,000 A | * | 11/1959 | Green ...................... | 137/515.5 |
| 3,029,835 A | * | 4/1962 | Biello et al. ............. | 137/515.5 |
| 3,097,666 A | * | 7/1963 | Antrim et al. ........... | 137/515.5 |
| 3,500,859 A | * | 3/1970 | Pearson .................. | 137/614.05 |
| 3,601,361 A | * | 8/1971 | Hundhausen et al. .... | 251/149.1 |
| 4,035,005 A | * | 7/1977 | DeVincent et al. ........ | 285/319 |
| 4,483,510 A | * | 11/1984 | Palau et al. ............... | 251/149.6 |
| 4,819,908 A | * | 4/1989 | Norkey ..................... | 251/149.6 |
| 4,902,043 A | * | 2/1990 | Zillig et al. .............. | 285/4 |
| 5,056,756 A | * | 10/1991 | Norkey et al. ............ | 251/149.6 |
| 5,113,900 A | * | 5/1992 | Gilbert ..................... | 137/515.5 |
| 5,161,834 A | * | 11/1992 | Norkey ........................ | 285/319 |
| 5,485,982 A | | 1/1996 | Gunderson | |
| 5,785,358 A | * | 7/1998 | Kujawski et al. ............. | 285/93 |
| 5,988,705 A | | 11/1999 | Norkey | |
| 6,042,084 A | * | 3/2000 | Botosan et al. ............. | 251/337 |
| 6,340,180 B1 | * | 1/2002 | Wisniewski ................. | 285/319 |

FOREIGN PATENT DOCUMENTS

| | | | |
|---|---|---|---|
| GB | 813783 | * 5/1956 | ............. 137/515.5 |
| JP | 8-216707 | 8/1996 | |
| JP | 9-60744 | 3/1997 | |
| JP | 2000-320772 | 11/2000 | |

* cited by examiner

*Primary Examiner*—Michael Powell Buiz
*Assistant Examiner*—Meredith H. Schoenfeld
(74) *Attorney, Agent, or Firm*—Oblon, Spivak, McClelland, Maier & Neustadt, P.C.

(57) ABSTRACT

A connection member includes a nipple portion formed at one end and a first end face portion formed at an end part of the nipple portion. A valve cap includes a small-diameter portion; a large-diameter portion; a valve seat portion having a valve seal surface formed on an inner circumferential surface of the valve cap and located between the small-diameter portion and the large-diameter portion; and a fitting end portion fitted to the outer circumferential surface of the end part of the nipple portion. A valve body includes a bottom portion having an abutment part to abut the valve seal surface; a cylindrical open end portion extending from the bottom portion; a second end face portion formed at the open end portion in such a manner as to face the first end face portion; a first sliding portion provided on the open end portion; and a first flow path portion provided in the first sliding portion. The valve body is accommodated within the large-diameter portion in an axially slidable condition. A compression spring is disposed between the first end face portion and the second end face portion and adapted to bias the valve body toward the valve seat portion of the valve cap. One end portion of a flexible tube is fitted to the outer circumferential surface of the valve cap and the outer circumferential surface of the nipple portion.

19 Claims, 6 Drawing Sheets

CONNECTION STRUCTURE AND VALVED CONNECTION MEMBER

BACKGROUND OF THE INVENTION

1. Field of the Invention

The present invention relates to a valved connection member favorably usable in an evaporation piping system of an automobile fuel tank, etc. and to a connection structure using the valved connection member.

2. Description of the Related Art

The internal pressure of an automobile fuel tank built up by evaporated gasoline is controlled through connection of the fuel tank and a canister located on the engine side by means of piping. Specifically, a check valve is installed in an evaporation line connecting the fuel tank and the canister so as to allow flow of evaporated gasoline from the fuel tank to the engine but not in the reverse direction.

Conventionally, the fuel tank and the check valve are connected by means of a rubber hose, and the check valve and the canister are also connected by means of a rubber hose. Connections are each clamped from outside the rubber hose by means of a clamp member, such as a clip. However, such connection practice involves an increase in the number of components and very complicated connection work, resulting in increased cost.

According to recent tendencies, in order to suppress permeation of gasoline and to improve connection workability, a resin tube is used in place of a rubber hose. Resin tubes are used in the following manner. Resin tubes are connected to corresponding opposite ends of the check valve, and quick connectors are connected to the respective free ends of the resin tubes. The quick connectors are used for connection to the fuel tank and the canister.

A conventionally used check valve is configured such that a valve body is movably disposed within a substantially cylindrical housing, while being biased toward a valve seat formed at one end of the housing by means of a valve spring. Accordingly, the conventional check valve is a separate member from the quick connector and the rubber hose or resin tube and is press-fitted, for use, into an end portion of the rubber hose or the resin tube. Also, assembly of the check valve is complicated in terms of process and accuracy; for example, welding upper and lower housing halves is required.

As mentioned above, since the check valve to be installed in, for example, an evaporation piping system of an automobile fuel tank, is a separate member from the quick connector and the rubber hose or resin tube, the number of components increases and connection work becomes complicated, resulting in difficulty in reducing cost.

In order to meet recent requirements for further reduction in gasoline permeability, even very small permeation from a connection between the rubber hose or the resin tube and the check valve cannot be disregarded. Thus, a reduction in connections between components is an effective means for suppression permeation of gasoline.

SUMMARY OF THE INVENTION

An object of the present invention is to solve the above-mentioned problems, and to provide a connection member of simple structure equipped with a check valve allowing a reduction in the number of components of a piping system, such as an evaporation piping system, that requires installation of a check valve, and a reduction in the number of connections, as well as to provide a connection structure of low gasoline permeability and low cost favorably usable in, for example, an evaporation piping system employing a valved connection member.

To achieve the above object, according to a first aspect of the present invention, a connection structure comprises a valved connection member and a flexible tube connected to the valved connection member. The valved connection member comprises a cylindrical connection member, a cylindrical valve cap, a cylindrical valve body, and a compression spring. The cylindrical connection member comprises a cylindrical nipple portion formed at one end and allowing the inner circumferential surface of an end portion of the flexible tube to be fitted thereto; and an annular first end face portion formed at an end part of the nipple portion in such a manner as to face toward the one end and to extend radially. The cylindrical valve cap comprises a small-diameter portion and a large-diameter portion, an axial bore formed in the small-diameter portion being smaller in diameter than an axial bore formed in the large-diameter portion; a valve seat portion having a valve seal surface formed on the inner circumferential surface of the cylindrical valve cap and located between the small-diameter portion and the large-diameter portion; and a fitting end portion formed at one end of the large-diameter portion away from the small-diameter portion and fitted to the outer circumferential surface of the end part of the nipple portion of the connection member. The cylindrical valve body comprises a bottom portion having an abutment part to abut the valve seal surface of the valve cap; a cylindrical open end portion extending from the bottom portion and opening toward the connection member; an annular second end face portion formed at the open end portion in such a manner as to face the first end face portion and to extend radially; a first sliding portion extending radially outward from the open end portion in an integral condition; and a first flow path portion provided in the first sliding portion and allowing flow of fluid. The valve body is accommodated within the large-diameter portion of the valve cap in such a manner as to be axially slidable by virtue of the first sliding portion. The compression spring is disposed between the first end face portion and the second end face portion and adapted to bias the valve body toward the valve seal surface. One end portion of the flexible tube is fitted to the outer circumferential surface of the valve cap fitted to the outer circumferential surface of the end part of the nipple portion of the connection member and is further fitted to the outer circumferential surface of the nipple portion extending away from the outer circumferential surface of the valve cap.

According to the first aspect of the present invention, since the valve body is biased toward the valve seat portion by means of the compression spring, the abutment part of the bottom portion of the valve body is in close contact with the valve seal surface of the valve cap. Accordingly, when the upstream fluid pressure of the connection structure is lower than the downstream fluid pressure, a flow path including the first flow path portion is closed to thereby disable flow of fluid. In contrast, when the upstream fluid pressure becomes higher than the downstream fluid pressure, the valve body moves toward the connection member against the compression spring. Thus, the abutment part of the bottom portion of the valve body moves away from the valve seal surface and toward the connection member, thereby forming a gap between the abutment part and the valve seal surface. As a result, the flow path including the first flow path portion is opened to thereby permit downstream flow of fluid. In this case, the valve body can smoothly move within the large-diameter portion in the axial direction by virtue of the first sliding portion. Also, the first flow path portion provided in the first sliding portion smoothens flow of fluid.

Since the connection structure is configured such that the valve body is accommodated within the valve cap fitted to the connection member, the number of components as well as the number of connections can be reduced. Thus, the cost of the connection structure can be reduced, and assembly work time can be shortened.

Even though the valve cap is merely fitted to the outer circumferential surface of the end part of the nipple portion of the connection member, since one end portion of the flexible tube is fitted to the outer circumferential surface of the valve cap fitted to the connection member and is further fitted to the outer circumferential surface of the nipple portion extending away from the outer circumferential surface of the valve cap, the connection can exhibit low gasoline permeability. Since no welding is required for connection of the valve cap and the end part of the nipple portion of the connection member, the cost of connection can be reduced.

In the first aspect of the present invention, instead of the first sliding portion and the first flow path portion being provided on the open end portion of the valve body, the first sliding portion and the first flow path can be provided on the inner circumferential surface of the large-diameter portion of the valve cap in the vicinity of the boundary between the large-diameter and small-diameter portions. When the upstream fluid pressure of the connection structure becomes higher than the downstream fluid pressure, so that the valve body moves toward the connection member against the compression spring, the first sliding portion provided on the valve cap allows smooth axial movement of the valve body within the large-diameter portion, and the first flow path portion provided in the first sliding portion allows smooth flow of fluid.

The first aspect of the present invention allows the valve body to further comprise a second sliding portion extending from the bottom portion away from the open end portion and accommodated slidably within the small-diameter portion of the valve cap; and a second flow path portion formed in the second sliding portion and allowing flow of fluid. The second sliding portion allows further smooth axial movement of the valve body, and the second flow path portion allows smooth flow of fluid at the second sliding portion.

In the first aspect of the present invention, instead of the first sliding portion being provided on the open end portion of the valve body or on the inner circumferential surface of the large-diameter portion of the valve cap in the vicinity of the boundary between the large-diameter and small-diameter portions, the sliding portion can be provided in such a manner as to extend from the bottom portion away from the open end portion. When the upstream fluid pressure of the connection structure becomes higher than the downstream fluid pressure, so that the valve body moves toward the connection member against the compression spring, the sliding portion allows smooth axial movement of the valve body within the small-diameter and large-diameter portions, and the flow path portion provided in the sliding portion allows smooth flow of fluid.

As described above, the first aspect of the present invention can provide the connection structure of simple structure equipped with a valve limiting flow to a single direction (a check valve) and featuring a small number of components and a small number of connections with a tube, thereby reducing the cost of a connection structure to be used in, for example, an evaporation piping system as well as assembly work time. Furthermore, even though the valve cap is merely fitted to the outer circumferential surface of the end part of the nipple portion of the connection member, since one end portion of the flexible tube is fitted to the outer circumferential surface of the valve cap fitted to the connection member and is further fitted to the outer circumferential surface of the nipple portion extending away from the outer circumferential surface of the valve cap, the connection can exhibit low gasoline permeability. Since welding is not necessarily required for connection of the valve cap and the end part of the nipple portion of the connection member, low gasoline permeability can be achieved at low cost.

According to the first aspect of the present invention, the connection structure allows a flow adjustment bore to be axially formed in the bottom portion of the valve body in such a manner as to extend through the bottom portion. When the upstream fluid pressure of the connection structure is lower than the downstream fluid pressure, a flow path, including the flow path portion is closed. However, the flow adjustment bore formed in the bottom portion of the valve body permits upstream flow of fluid of very low flow rate. When the upstream fluid pressure of the connection structure is slightly greater than the downstream fluid pressure but is not sufficiently great to move the valve body against the compression spring, the flow path including the flow path portion is closed, while fluid flows downstream at a very low flow rate through the flow adjustment bore formed in the bottom portion of the valve body. When the upstream fluid pressure of the connection structure becomes sufficiently greater than the downstream fluid pressure to move the valve body against the compression spring, the abutment part of the bottom portion of the valve body moves away from the valve seal surface and toward the connection member, thereby forming a gap between the abutment part and the valve seal surface. As a result, the flow path including the flow path portion is opened to thereby permit downstream flow of fluid of high flow rate. That is, the flow adjustment bore formed in the bottom portion of the valve body enables adjustment of the rate of downstream flow of fluid according to the difference between upstream and downstream fluid pressures of the connection structure.

According to a second aspect of the present invention, a valved connection member to be connected with a flexible tube comprises a cylindrical connection member, a cylindrical valve cap, a valve body, and a compression spring. The cylindrical connection member comprises a cylindrical nipple portion formed at one end and allowing the inner circumferential surface of an end portion of the flexible tube to be fitted thereto. The cylindrical valve cap comprises a small-diameter portion and a large-diameter portion. A valve seal surface is formed on the inner circumferential surface of the cylindrical valve cap and located between the small-diameter portion and the large-diameter portion. The cylindrical valve cap is fitted to an end part of the nipple portion of the connection member with the large-diameter portion facing the connection member. The valve body comprises a bottom portion having an abutment part to abut the valve seal surface of the valve cap. The valve body is accommodated within the large-diameter portion of the valve cap in such a manner as to be axially slidable. The compression spring is disposed between the large-diameter portion of the valve cap and the nipple portion of the connection member and adapted to bias the valve body toward the valve seal surface of the valve cap.

The valved connection member according to the second aspect of the present invention can form a connection structure through fitting of one end portion of the flexible tube to the outer circumferential surface of the valve, cap fitted to the outer circumferential surface of the end part of the nipple portion of the connection member as well as to the outer circumferential surface of the nipple portion extending away from the outer circumferential surface of the valve cap. When the upstream fluid pressure of the connection structure is lower than the downstream fluid pressure, the abutment part of the bottom portion of the valve body is in contact with the valve seal surface of the valve cap to thereby close a flow path, thereby disabling flow of fluid. In contrast, when the upstream fluid pressure becomes higher than the downstream fluid pressure, the valve body moves toward the connection member against the compression spring. Thus, the abutment part of the bottom portion of the valve body moves away from the valve seal surface and toward the connection member, thereby opening the flow path, thereby permitting downstream flow of fluid.

Since the valved connection member is configured such that the valve body is accommodated within the valve cap fitted to the connection member, the number of components required to form a connection structure as well as the number of connections can be reduced. Thus, the cost of the connection structure can be reduced, and assembly work time can be shortened.

The valved connection member is configured such that the valve cap is merely fitted to the outer circumferential surface of the end part of the nipple portion of the connection member. However, since one end portion of the flexible tube is fitted to the outer circumferential surface of the valve cap fitted to the connection member and is further fitted to the outer circumferential surface of the nipple portion extending away from the outer circumferential surface of the valve cap, the connection can exhibit low gasoline permeability. Since welding is not necessarily required for connection of the valve cap and the end part of the nipple portion of the connection member, the cost of the valved connection member can be reduced.

According to the second aspect of the present invention, a valved connection member comprises a cylindrical connection member, a cylindrical valve cap, a cylindrical valve body, and a compression spring. The cylindrical connection member comprises a cylindrical nipple portion formed at one end and allowing the inner circumferential surface of an end portion of the flexible tube to be fitted thereto; and an annular first end face portion formed at an end part of the nipple portion in such a manner as to face toward the one end and to extend radially. The cylindrical valve cap comprises a small-diameter portion and a large-diameter portion, an axial bore formed in the small-diameter portion being smaller in diameter than an axial bore formed in the large-diameter portion; a valve seat portion having a valve seal surface formed on the inner circumferential surface of the cylindrical valve cap and located between the small-diameter portion and the large-diameter portion; and a fitting end portion formed at one end of the large-diameter portion away from the small-diameter portion and fitted to the outer circumferential surface of the end part of the nipple portion of the connection member. The cylindrical valve body comprises a bottom portion having an abutment part to abut the valve seal surface of the valve cap; a cylindrical open end portion extending from the bottom portion and opening toward the connection member; an annular second end face portion formed at the open end portion in such a manner as to face the first end face portion and to extend radially; a first sliding portion extending radially outward from the open end portion in an integral condition; and a first flow path portion provided in the first sliding portion and allowing flow of fluid. The valve body is accommodated within the large-diameter portion of the valve cap in such a manner as to be axially slidable by virtue of the first sliding portion. The compression spring is disposed between the first end face portion and the second end face portion and adapted to bias the valve body toward the valve seat portion of the valve cap.

The valved connection member can form a connection structure through fitting of one end portion of the flexible tube to the outer circumferential surface of the valve cap fitted to the outer circumferential surface of the end part of the nipple portion of the connection member as well as to the outer circumferential surface of the nipple portion extending away from the outer circumferential surface of the valve cap. When the upstream fluid pressure of the connection structure becomes higher than the downstream fluid pressure, the valve body can axially move toward the connection member within the large-diameter portion of the valve cap in a smooth manner effected by the first sliding portion, and the first flow path portion provided in the first sliding portion permits smooth flow of fluid.

In the valved connection member according to the second aspect of the present invention, instead of the first sliding portion being provided on the open end portion of the valve body, the first sliding portion can be provided on the inner circumferential surface of the large-diameter portion of the valve cap in the vicinity of the boundary between the large-diameter and small-diameter portions. When the valve body moves toward the connection member against the compression spring, the first sliding portion provided on the valve cap allows smooth axial movement of the valve body within the large-diameter portion, and the first flow path portion provided in the first sliding portion allows smooth flow of fluid.

The second aspect of the present invention allows the valve body to further comprise a second sliding portion extending from the bottom portion away from the open end portion and accommodated slidably within the small-diameter portion of the valve cap; and a second flow path portion formed in the second sliding portion and allowing flow of fluid. The second sliding portion allows further smooth axial movement of the valve body, and the second flow path portion allows smooth flow of fluid at the second sliding portion.

In the second aspect of the present invention, instead of the first sliding portion being provided on the open end portion of the valve body or on the inner circumferential surface of the large-diameter portion of the valve cap in the vicinity of the boundary between the large-diameter and small-diameter portions, the sliding portion can be provided in such a manner as to extend from the bottom portion away from the open end portion. When the upstream fluid pressure of the connection structure becomes higher than the downstream fluid pressure, so that the valve body moves toward the connection member against the compression spring, the sliding portion allows smooth axial movement of the valve body within the small-diameter and large-diameter portions of the valve cap, and the flow path portion provided in the sliding portion allows smooth flow of fluid.

According to the second aspect of the present invention, there can be provided a valved connection member capable of forming at low cost a connection structure that exhibits low gasoline permeability suited for application to, for example, an evaporation piping system.

According to the second aspect of the present invention, the valved connection member allows a flow adjustment bore to be axially formed in the bottom portion of the valve body in such a manner as to extend through the bottom portion. The flow adjustment bore allows flow of fluid of a certain flow rate, which corresponds to the bore size. When the upstream fluid pressure of the connection structure becomes sufficiently greater than the downstream fluid pressure to move the valve body against the compression spring, a flow path including the flow path portion is opened to thereby permit downstream flow of fluid of high flow rate. That is, the flow adjustment bore enables adjustment of the rate of downstream flow of fluid according to the difference between upstream and downstream fluid pressures of the connection structure.

DESCRIPTION OF THE PREFERRED EMBODIMENTS

A valved connection member of the preferred embodiment of the present invention has a nipple portion at one end for connection with a flexible tube, such as a resin tube. A valve that limits flow to a single direction is disposed at an end of the nipple portion. The valve is a check valve (a so-called one-way valve) and opens a flow path to thereby allow flow from one end thereof to the other end thereof, according to the pressure difference between the opposite ends thereof, whereas flow in the opposite direction is disabled.

The valved connection member of this embodiment allows press-fitting of a flexible tube, such as a resin tube or a rubber tube, or any other tube or hose, to the nipple portion provided at one end of a connection member. The other end of the connection member is generally connected to a mating member by use of, for example, a known quick connector. However, the form of the connection member is not limited thereto. For example, a pipe of mating equipment may serves as the connection member such that an end of the pipe is formed into the nipple portion.

Figure 1:
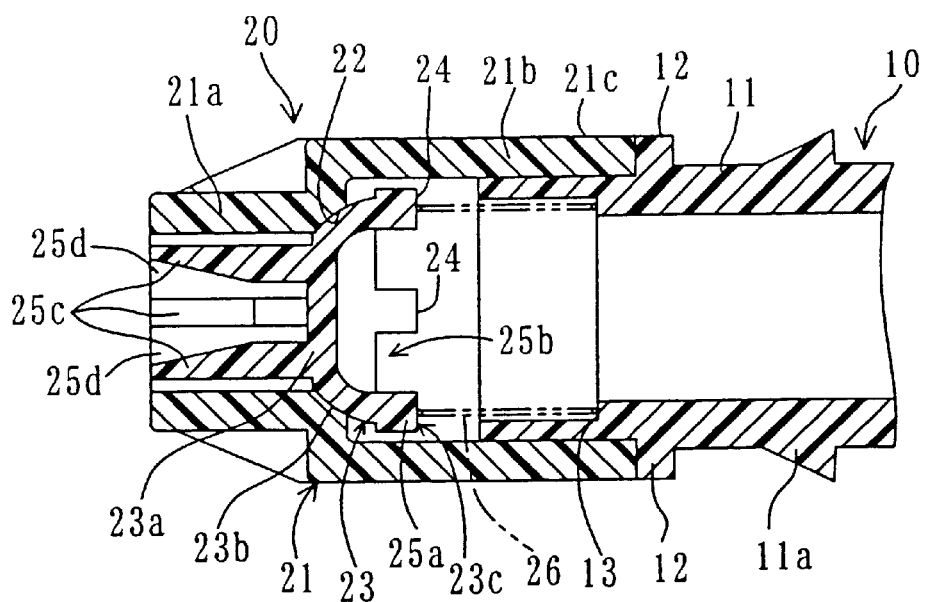
FIG. 1 is a schematic sectional view showing a valved connection member according to a first embodiment of the present invention.

Embodiments of the present invention will next be described with reference to the drawings. FIG. 1 shows a valved connection member according to a first embodiment of the present invention. A cylindrical connection member 10 of the valved connection member has a nipple portion 11 for connection with a flexible tube. A plurality of circumferential protrusions 11a are formed on the outer circumferential surface of the nipple portion 11. A valve 20, which is a check valve, is provided at an end of the nipple portion 11. The valve 20 includes a valve cap 21, a valve body 23, and a compression spring 26.

The cylindrical valve cap 21 includes a small-diameter portion 21a having an axial bore formed therein, a large-diameter portion 21b having an axial bore formed therein, and a fitting end portion 21c. An upstream portion of the cylindrical valve cap 21 is formed into the small-diameter portion 21a, whereas a downstream portion is formed into the fitting end portion 21c (hereinafter the terms "upstream" and "downstream" are used in relation to the direction of flow in the valve 20). The axial bore of the small-diameter portion 21a is smaller in diameter than that of the large-diameter portion 21b. The fitting end portion 21c is fitted onto an end part of the nipple portion 11 of the connection member 10 in such a manner as to abut a flange portion 12 provided on the outer circumferential surface of the nipple portion 11 upstream of the circumferential protrusions 11a, thereby being positioned. The valve cap 21 has a valve seal surface 22 formed on an inner surface of a valve seat portion located between the small-diameter portion 21a and the large-diameter portion 21b. The compression spring 26 biases the valve body 23 upstream such that the outer surface of the valve body 23 is in close contact with the valve seal surface 22.

Figure 2:
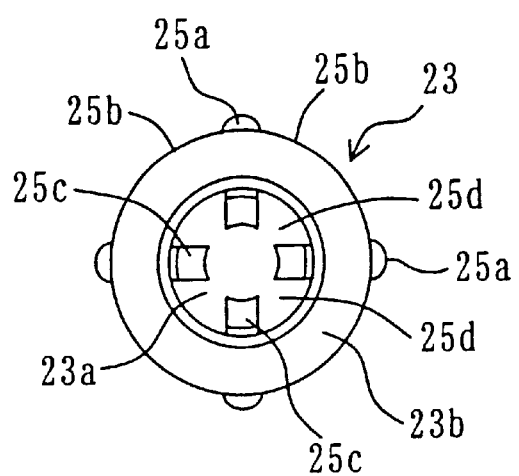
FIG. 2 is a schematic side view of a valve body for use in the valved connection member.

As shown in FIGS. 1 and 2, the valve body 23 is curved at a certain curvature such that the diameter thereof increases toward the downstream side, and includes a bottom portion 23a, which closes the upstream end of the valve body 23. An abutment part 23b is provided on the outer surface of the bottom portion 23a and adapted to abut the valve seal surface 22. The valve body 23 further includes a cylindrical open end portion 23c, which opens downstream. A plurality of second end face portions 24 each extending radially are provided on the end face of the open end portion 23c in such a manner as to be equally spaced along the circumferential direction.

A plurality of first sliding portions 25a are integrally provided on the outer circumferential surface of the open end portion 23c along the end of the open end portion 23c in such a condition as to project radially outward and adapted to slide on the inner circumferential surface of the large-diameter portion 21b of the valve cap 21. Accordingly, as shown in FIG. 1, first flow path portion 25b is formed between the outer circumferential surface of the open end portion 23c of the valve body 23 and the first sliding portions 25a projecting radially outward from the outer circumferential surface of the open end portion 23c. A plurality of second sliding portions 25c are provided on the upstream side of the bottom portion 23a in such a condition as to project axially and to be equally spaced along the circumferential direction, and are adapted to slide on the inner circumferential surface of the small-diameter portion 21a of the valve cap 21. Gaps between the second sliding portions 25c serve as a second flow path portion 25d and allow flow of fluid.

The valve body 23 is accommodated within the large-diameter portion 21b of the valve cap 21 in an axially movable condition, while the second sliding portions 25c are inserted in the small-diameter portion 21a of the valve cap 21. The compression spring 26 is disposed between the second end face portions 24 of the valve body 23 and an annular first end face portion 13 formed on the inner circumferential surface of an end part of the nipple portion 11 of the connection member 10 in such a manner as to extend radially from the inner circumferential surface. The compression spring 26 is adapted to bias the valve body 23 upstream.

The operation of the valve 20 will next be described.

In the normal state, as shown in FIG. 1, the valve body 23 is biased upstream by means of the compression spring 26; thus, the abutment part 23b of the bottom portion 23a of the valve body 23 is in close contact with the valve seal surface 22 of the valve cap 21. Accordingly, when the upstream fluid pressure of the valve 20 is lower than the downstream fluid pressure, a flow path including the first flow path portion 25b is closed, thereby disabling flow of fluid.

Figure 3:
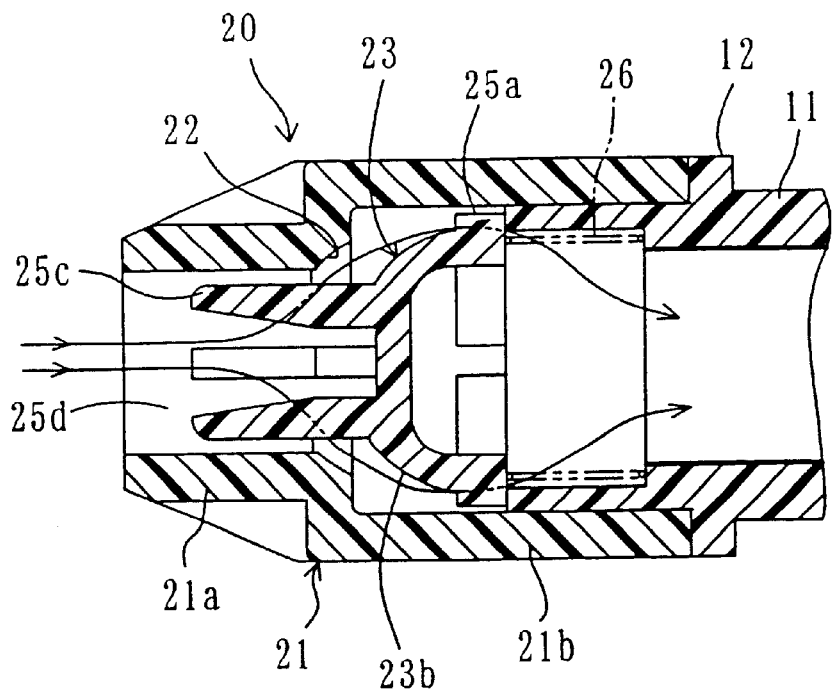
FIG. 3 is a schematic sectional view showing a state of the valved connection member in which a flow path is opened.

When the upstream fluid pressure of the valve 20 becomes higher than the downstream fluid pressure, as shown in FIG. 3, the valve body 23 is moved downstream against the compression spring 26. Thus, the abutment part 23b of the bottom portion 23a of the valve body 23 moves away from the valve seal surface 22 and into the large-diameter portion 21b of the valve cap 21, thereby forming a gap between the abutment part 23b and the valve seal surface 22. As a result, the flow path of the valve 20 is opened. Therefore, as represented by the illustrated arrows, fluid flows from the upstream side of the valve 20 to the downstream side via the second flow path portion 25d and the first flow path portion 25b.

The valve body 23 is provided with the first sliding portions 25a, which slide on the inner circumferential surface of the large-diameter portion 21b of the valve cap 21, and preferably provided with the second sliding portions 25c, which slide on the inner circumferential surface of the small-diameter portion 21a of the valve cap 21, thereby readily preventing inclination of the valve body 23 when the valve body 23 is in process of moving or resting on the valve seal surface 22. Thus, the valve body 23 moves smoothly within the valve cap 21 along the axial direction, and fluid flows smoothly through the first and second flow path portions 25b and 25d.

Figure 4:
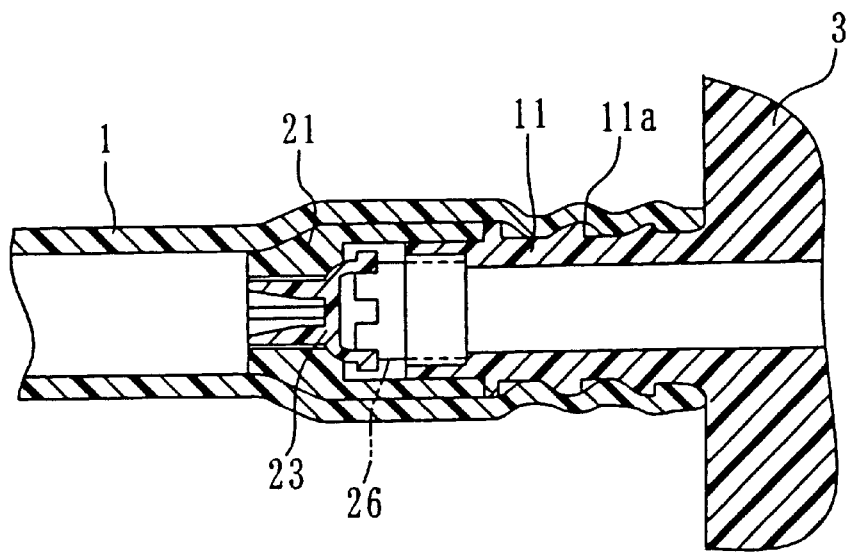
FIG. 4 is a schematic sectional view showing an embodiment of a connection structure using the valved connection member.

The valve 20 according to the present embodiment is attached to the end part of the nipple portion 11 of the connection member 10. The valve cap 21 and the nipple portion 11 can be fixedly engaged through press-fitting or bonding. A resin or rubber tube or a like tube is connected to the nipple portion 11. Thus, as shown in FIG. 4, after the valve cap 21, into which, for example, the valve body 23 and the compression spring 26 are incorporated, is attached to the nipple portion 11 in a removable condition, a tube 1 is press-fitted to the nipple portion 11. Since the circumferential protrusions 11a prevent slipping-out of the tube 1, the valve cap 21 can be reliably held in place without use of press-fitting or adhesive.

Since the valve is configured such that the valve body 23 is accommodated within the valve cap 21 fitted to the connection member 10, the number of components as well as the number of connections can be reduced. Thus, the cost of the connection structure can be reduced, and assembly work time can be shortened. Furthermore, although the valve cap 21 is merely fitted to the outer circumferential surface of the end part of the nipple portion 11 of the connection member 10, since one end portion of the tube is fitted to the outer circumferential surface of the valve cap 21 fitted to the connection member 10 and is further fitted to the outer circumferential surface of the nipple portion 11 extending downstream of the outer circumferential surface of the valve cap 21, the connection can exhibit low gasoline permeability. Since welding is not required for connection of the valve cap 21 and the end part of the nipple portion 11 of the connection member 10, the cost of connection can be reduced.

As shown in FIG. 4, for example, a pipe of equipment 3 can serve as the nipple portion 11 of the connection member 10. However, usually, as shown in FIG. 5, the downstream end of the connection member 11 assumes the form of a connector for connection with a mating member 2.

Figure 5:
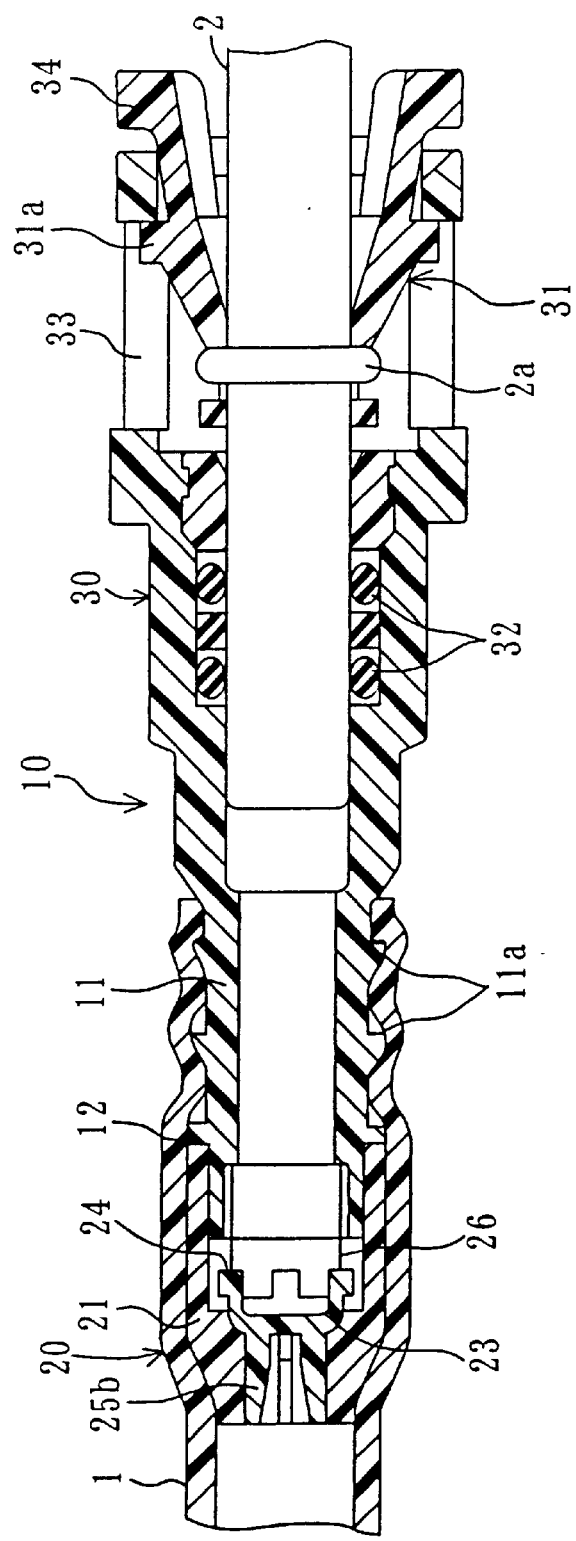
FIG. 5 is a schematic sectional view showing another embodiment of a connection structure using the valved connection member.

FIG. 5 shows another embodiment of a connection structure using a valved connection member. The valve 20 is attached to the nipple portion 11 located at the upstream end of the connection member 10, and the resin tube 1 is connected to the nipple portion 11 in such a manner as to cover the valve 20. The mating member 2 is connected to the connector portion located at the downstream end of the connection member 10.

In FIG. 5, the connector portion of the connection member 10 assumes the form of a known quick connector. The connector portion comprises a cylindrical housing 30 extending from the nipple portion 11 to the downstream end of the connection member 10 and an engagement member 31 which assumes a substantially cylindrical form having a gradually increasing diameter and which is cut in at least a single position so as to be elastically deformable. The engagement member 31 is attached to the housing 30 in the following manner. The engagement member 31 is inserted into the housing 30 through an end opening thereof while being squeezed, and is then snap-engaged with a window portion 33 formed in the housing 30. Notably, seal members 32, such as O-rings, are disposed within the housing 30 in order to seal the space between the housing 30 and the mating member 2.

The mating member 2 is inserted into the housing 30 through a downstream end opening formed in the engagement member 31. The upstream end of the engagement member 31 is expanded radially so as to allow passage of a circumferential protrusion 2a of the mating member 2 and then narrowed radially so as to be engaged with the circumferential protrusion 2a, thereby establishing engagement with the mating member 2. The engagement member 31 includes an operation arm portion 34 located at the downstream end. When the mating member 2 is to be removed, a user presses the operation arm portion 34 radially inward so as to squeeze the entire engagement member 31.

Figure 6:
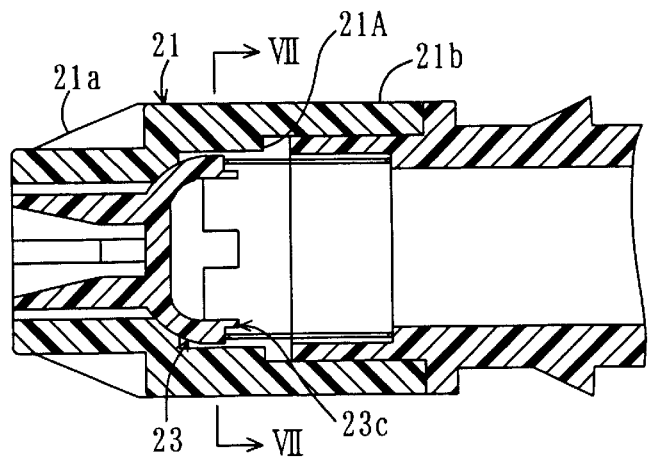
FIG. 6 is a schematic sectional view showing a modified valved connection member of the first embodiment.
Figure 7:
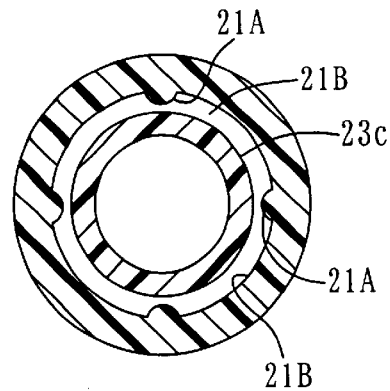
FIG. 7 is a sectional view taken along line VII—VII of FIG. 6.

Next will be described a modified valved connection member of the above-described first embodiment. In contrast to the first embodiment, in which the first sliding portions 2a are provided on the open end portion 23c of the valve body 23, as shown in FIGS. 6 and 7, a valved connection member of the modified embodiment includes a plurality of first sliding portions 21A provided on the inner circumferential surface of the large-diameter portion 21b in the vicinity of the boundary between the small-diameter portion 21a and the large-diameter portion 21b. The first sliding portions 21A project radially inward from the inner circumferential surface of the large-diameter portion 21b and are arranged along the circumferential direction. Gaps between the first sliding portions 21A serve as a first flow path portion 21B. According to the present modified embodiment, when the upstream fluid pressure of the connection structure becomes higher than the downstream fluid pressure, so that the valve body 23 moves downstream against the compression spring 26, the first sliding portions 21A allow smooth axial movement of the valve body 23 within the large-diameter portion 21b, and the first flow path portion 21B provided in the first sliding portions 21A allows smooth flow of fluid.

Figure 8:
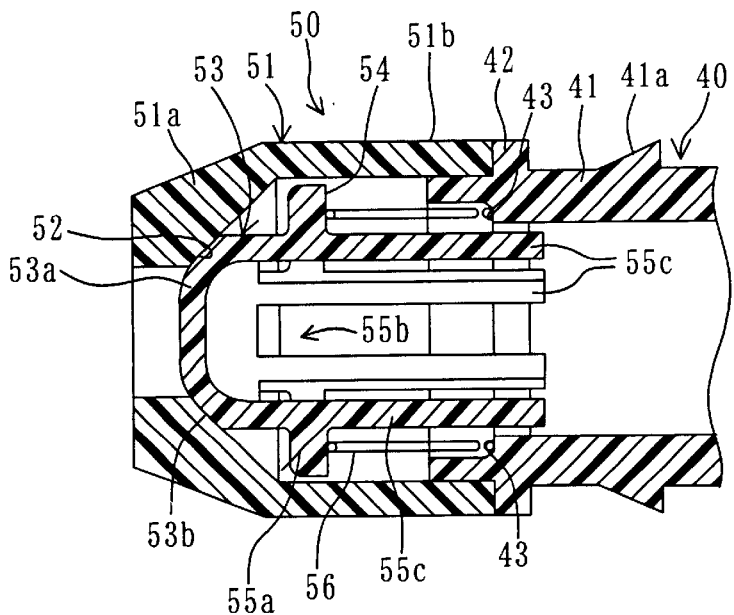
FIG. 8 is a schematic sectional view showing a valved connection member according to a second embodiment of the present invention.
Figure 9:
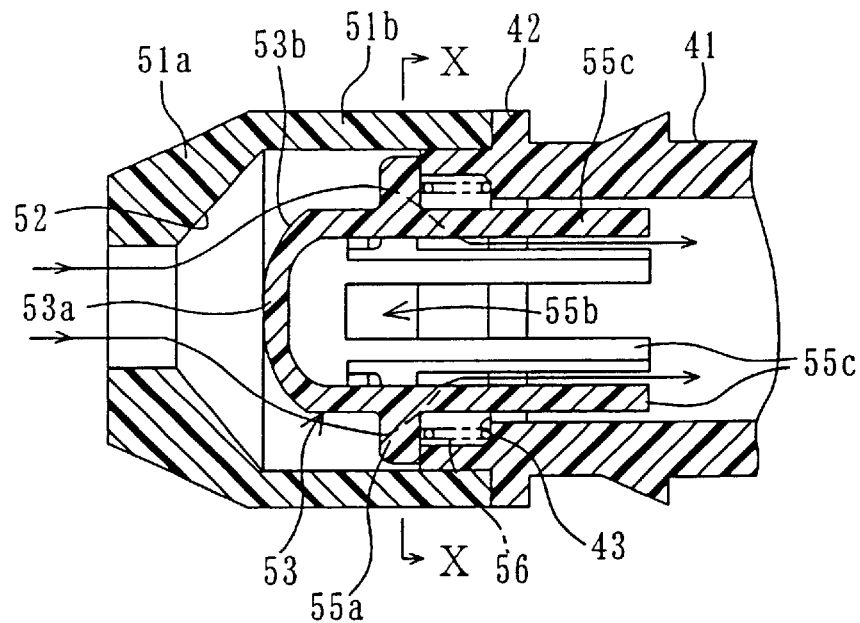
FIG. 9 is a schematic sectional view showing a state of the valved connection member of the second embodiment in which a flow path is opened.
Figure 10:
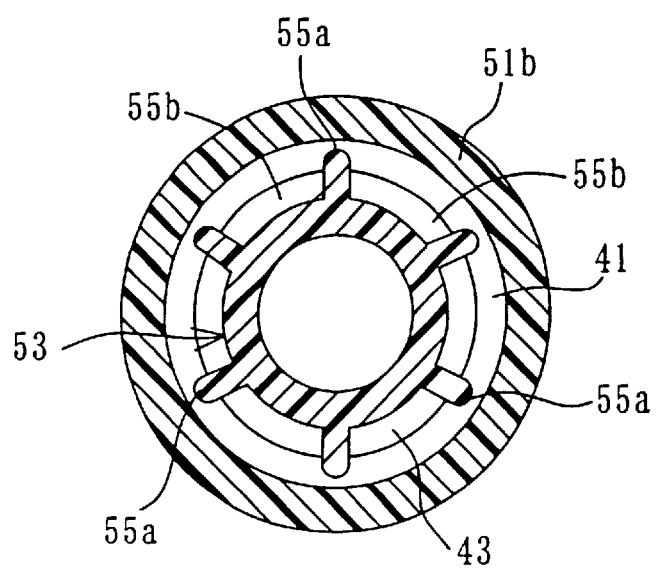
FIG. 10 is a sectional view taken along line X—X of FIG. 9.

Next, a second embodiment of the present invention will be described with reference to FIGS. 8 to 10. A valved connection member of the present embodiment is not provided with a sliding portion on the upstream side of the valve body 23 but is provided only with a sliding portion on the downstream side of the valve body 23. A valve cap 51 of a valve 50 of the present embodiment includes an upstream small-diameter portion 51a and a downstream large-diameter portion 51b. An end part of the large-diameter portion 51b is fitted onto an end part of a nipple portion 41 of the connection member 10 in such a manner as to abut a flange portion 42 provided on the outer circumferential surface of the nipple portion 41 upstream of circumferential protrusions 41a, thereby being positioned. The valve cap 51 has a valve seal surface 52 formed on its inner surface and located between the small-diameter portion 51a and the large-diameter portion 51b. A compression spring 56 biases a valve body 53 upstream such that an abutment part 53b of the outer surface of the valve body 53 is in close contact with the valve seal surface 52.

The valve body 53 includes a bottom portion 53a, which closes the upstream end of the valve body 53. The abutment part 53b is provided on the outer surface of the bottom portion 53a and adapted to abut the valve seal surface 52. A plurality of first sliding portions 55a are formed on the downstream side of the bottom portion 53a in such a condition as to be equally spaced along the circumferential direction and to project radially outward. The downstream side of each of the first sliding portions 55a serves as a second end face portion 54, which extend radially. Gaps between the first sliding portions 55a serve as a first flow path portion 55b, through which fluid flows. Also, a plurality of axially projecting sliding portions 55c are provided on the downstream side of the bottom portion 53 in such a condition as to be slidable on the inner circumferential surface of the nipple portion 41 and equally spaced along the circumferential direction and extending axially.

The valve body 53 is accommodated within the large-diameter portion 51b of the valve cap 51 in an axially slidable condition and such that the axially projecting sliding portions 55c are inserted into the nipple portion 41. The compression spring 56 is disposed between the second end face portions 54 of the valve body 53 and an annular first end face portion 43 formed on the inner circumferential surface of an end part of the nipple portion 41 in such a manner as to extend radially from the inner circumferential surface. The compression spring 56 is adapted to bias the valve body 53 upstream.

The valve 50 of the second embodiment also operates in a manner similar to that of the first embodiment. Specifically, in the normal state, as shown in FIG. 8, the valve body 53 is biased upstream by means of the compression spring 56; thus, the abutment part 53b of the bottom portion 53a of the valve body 53 is in close contact with the valve seal surface 52 of the valve cap 51. Accordingly, when the upstream fluid pressure of the valve 50 is lower than the downstream fluid pressure, a flow path is closed. When the upstream fluid pressure of the valve 50 becomes higher than the downstream fluid pressure, as shown in FIG. 9, the valve body 53 is moved downstream against the compression spring 56. Thus, the abutment part 53b moves downstream away from the valve seal surface 52, thereby forming a gap between the abutment part 53b and the valve seal surface 52. As a result, the flow path of the valve 50 is opened. Therefore, as represented by the illustrated arrows, fluid flows downstream via the first flow path portion 55b.

In the valve body 53 of the second embodiment, the first sliding portions 55a—which slide on the inner circumferential surface of the large-diameter portion 51b of the valve cap 51—and the axially projecting sliding portions 55c—which slide on the inner circumferential surface of the nipple portion 41 of the connection member 40—readily prevent inclination of the valve body 53 when the valve body 53 is in process of moving axially or resting on the valve seal surface 52. Thus, the valve body 53 moves smoothly within the valve cap 51 along the axial direction, and fluid flows smoothly through the first flow path portion 55b.

Figure 11:
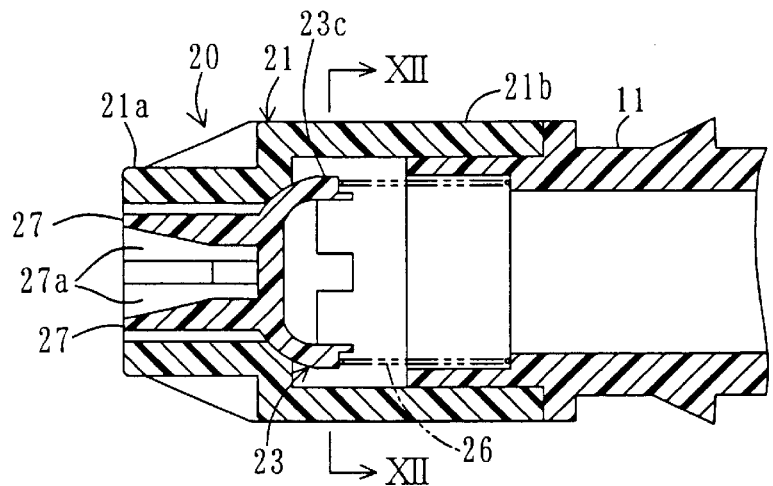
FIG. 11 is a schematic sectional view showing a valved connection member according to a third embodiment of the present invention.
Figure 12:
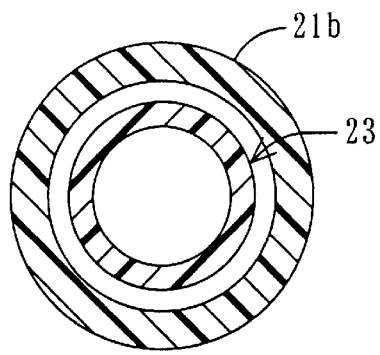
FIG. 12 is a sectional view taken along line XII—XII of FIG. 11.

Next, a third embodiment of the present invention will be described with reference to FIGS. 11 to 12. A valved connection member of the present embodiment differs from that of the above-described first embodiment in that a sliding portion is not provided on the open end portion 23c of the valve body 23 but is provided only on the upstream side of the bottom portion 23a. Specifically, a plurality of sliding portions 27 integrally project in an axial direction from the upstream side of the bottom portion 23a in a circumferentially arranged condition. Gaps between the sliding portions 27 serve as a flow path portion 27a. When the upstream fluid pressure of the connection structure becomes higher than the downstream fluid pressure; thus, the valve body 23 is moved downstream against the compression spring 26, the sliding portions 27 allow smooth axial movement of the valve body 23 within the small-diameter portion 21a and large-diameter portion 21b, and the flow path portion 27a provided in the sliding portions 27 allows smooth flow of fluid. Thus, the valved connection member of the third embodiment is simpler in structure than that of the first embodiment but yields actions and effects similar to those yielded by the valved connection member of the first embodiment.

Figure 13:
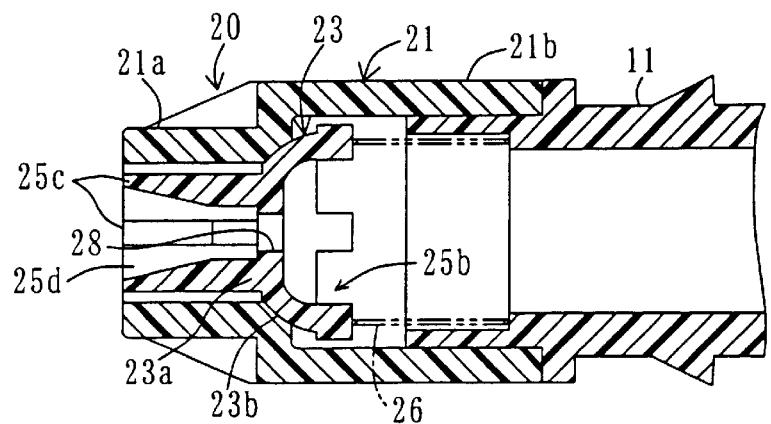
FIG. 13 is a schematic sectional view showing a valved connection member according to a fourth embodiment of the present invention.

Next, a fourth embodiment of the present invention will be described with reference to FIG. 13. A valved connection member of the present embodiment differs from that of the above-described first embodiment in that a flow adjustment bore 28 is formed in the bottom portion 23a of the valve body 23 in such a manner as to extend through the bottom portion 23a.

According to the present embodiment, when the upstream fluid pressure of a connection structure is lower than the upstream fluid pressure, a flow path including the first flow path portion 25b is closed. However, the flow adjustment bore 28 formed in the bottom portion 23a permits downstream flow of fluid of very low flow rate. When the upstream fluid pressure of the connection structure is slightly greater than the downstream fluid pressure but is not sufficiently great to move the valve body 23 against the compression spring 26, the flow path including the first flow path portion 25b is closed, while fluid flows downstream at a very low flow rate through the flow adjustment bore 28.

When the upstream fluid pressure of the connection structure becomes sufficiently greater than the downstream fluid pressure to move the valve body 23 against the compression spring 26, the abutment part 23b of the bottom portion 23a of the valve body 23 moves away from the valve seal surface 22 and downstream of the large-diameter portion 21b, thereby forming a gap between the abutment part 23b and the valve seal surface 22. As a result, the flow path including the first flow path portion 25b is opened to thereby permit downstream flow of fluid of high flow rate. That is, according to the present embodiment, the rate of downstream flow of fluid can be adjusted according to the difference between upstream and downstream fluid pressures of the connection structure. Notably, the above-described other embodiments and modified embodiment may have a similar flow adjustment bore formed in the bottom portion of the valve body to thereby yield the above-described effect.

In the above-described valved connection members of the present invention, all components but the spring can be made of synthetic resins. For example, preferably, the connection member including the nipple portion is made of nylon, and the valve cap and the valve body are made of polyacetal. The spring is made of metal, such as stainless steel. A tube to be connected to the nipple portion of the connection member is not particularly limited. For example, the tube is a resin or rubber tube.

What is claimed is:

1. A connection structure comprising a valved connection member and a flexible tube connected to said valved connection member, said valved connection member comprising:

a cylindrical connection member comprising a cylindrical nipple portion formed at one end and allowing an inner circumferential surface of an end portion of said flexible tube to be fitted thereto; and an annular first end face portion formed at an end part of the nipple portion in such a manner as to face toward the one end and to extend radially;

a cylindrical valve cap comprising a small-diameter portion and a large-diameter portion, an axial bore formed in the small-diameter portion being smaller in diameter than an axial bore formed in the large-diameter portion; a valve seat portion having a valve seal surface formed on an inner circumferential surface of said cylindrical valve cap and located between the small-diameter portion and the large-diameter portion; and a fitting end portion formed at one end of the large-diameter portion away from the small-diameter portion and fitted to an outer circumferential surface of the end part of the nipple portion of said connection member;

a cylindrical valve body comprising a bottom portion having an abutment part to abut the valve seal surface of said valve cap; a cylindrical open end portion extending from the bottom portion and opening toward the connection member; an annular second end face portion formed at the open end portion in such a manner as to face the first end face portion and to extend radially; a first sliding portion extending radially outward from the open end portion in an integral condition; and a first flow path portion provided in the first sliding portion and allowing flow of fluid; said valve body being accommodated within the large-diameter portion of said valve cap in such a manner as to be axially slidable by virtue of the first sliding portion; and a compression spring disposed between the first end face portion and the second end face portion and adapted to bias said valve body toward the valve seat portion of said valve cap;

one end portion of said flexible tube being fitted to an outer circumferential surface of said valve cap fitted to the outer circumferential surface of the end part of the nipple portion of said connection member as well as being fitted to an outer circumferential surface of the nipple portion extending away from the outer circumferential surface of said valve cap.

2. A connection structure according to claim 1, wherein said valve body further comprises a second sliding portion extending from the bottom portion away from the open end portion and accommodated slidably within the small-diameter portion of said valve cap; and a second flow path portion formed in the second sliding portion and allowing flow of fluid.

3. A connection structure according to claim 1 or 2, wherein a flow adjustment bore is axially formed in the bottom portion of said valve body in such a manner as to extend through the bottom portion.

4. A connection structure comprising a valved connection member and a flexible tube connected to said valved connection member, said valved connection member comprising:

a cylindrical connection member comprising a cylindrical nipple portion formed at one end and allowing an inner circumferential surface of an end portion of said flexible tube to be fitted thereto; and an annular first end face portion formed at an end part of the nipple portion in such a manner as to face toward the one end and to extend radially;

a cylindrical valve cap comprising a small-diameter portion and a large-diameter portion, an axial bore formed in the small-diameter portion being smaller-in diameter than an axial bore formed in the large-diameter portion; a valve seat portion having a valve seal surface formed on an inner circumferential surface of said cylindrical valve cap and located between the small-diameter portion and the large-diameter portion; a first sliding portion extending radially inward from an inner circumferential surface of the large-diameter portion in an integral condition and located in the vicinity of a boundary between the small-diameter portion and the large-diameter portion; a first flow path portion formed in the first sliding portion and allowing flow of fluid; and a fitting end portion formed at one end of the large-diameter portion away from the small-diameter portion and fitted to an outer circumferential surface of the end part of the nipple portion of said connection member;

a cylindrical valve body comprising a bottom portion having an abutment part to abut the valve seal surface of said valve cap; a cylindrical open end portion extending from the bottom portion and opening toward the connection member; and an annular second end face portion formed at the open end portion in such a manner as to face the first end face portion and to extend radially; said valve body being accommodated within the large-diameter portion of said valve cap in such a manner as to be axially slidable by virtue of the first sliding portion; and a compression spring disposed between the first end face portion and the second end face portion and adapted to bias said valve body toward the valve seat portion of said valve cap;

one end portion of said flexible tube being fitted to an outer circumferential surface of said valve cap fitted to the outer circumferential surface of the end part of the nipple portion of said connection member as well as being fitted to an outer circumferential surface of the nipple portion extending away from the outer circumferential surface of said valve cap.

5. A connection structure according to claim 4, wherein said valve body further comprises a second sliding portion extending from the bottom portion away from the open end portion and accommodated slidably within the small-diameter portion of said valve cap; and a second flow path portion formed in the second sliding portion and allowing flow of fluid.

6. A connection structure according to claim 4 or 5, wherein a flow adjustment bore is axially formed in the bottom portion of said valve body in such a manner as to extend through the bottom portion.

7. A connection structure comprising a valved connection member and a flexible tube connected to said valved connection member, said valved connection member comprising:
- a cylindrical connection member comprising a cylindrical nipple portion formed at one end and allowing an inner circumferential surface of an end portion of said flexible tube to be fitted thereto; and an annular first end face portion formed at an end part of the nipple portion in such a manner as to face toward the one end and to extend radially;
- a cylindrical valve cap comprising a small-diameter portion and a large-diameter portion, an axial bore formed in the small-diameter portion being smaller in diameter than an axial bore formed in the large-diameter portion; a valve seat portion having a valve seal surface formed on an inner, circumferential surface of said cylindrical valve cap and located between the small-diameter portion and the large-diameter portion; and a fitting end portion formed at one end of the large-diameter portion away from the small-diameter portion and fitted to an outer circumferential surface of the end part of the nipple portion of said connection member;
- a cylindrical valve body comprising a bottom portion having an abutment part to abut the valve seal surface of said valve cap; a cylindrical open end portion extending from the bottom portion and opening toward the connection member; an annular second end face portion formed at the open end portion in such a manner as to face the first end face portion and to extend radially; a sliding portion extending integrally from the bottom portion away from the open end portion; and a flow path portion provided in the sliding portion and allowing flow of fluid; said valve body being accommodated within said valve cap in such a manner as to be axially slidable by virtue of the sliding portion; and
- a compression spring disposed between the first end face portion and the second end face portion and adapted to bias said valve body toward the valve seat portion of said valve cap;
- one end portion of said flexible tube being fitted to an outer circumferential surface of said valve cap fitted to the outer circumferential surface of the end part of the nipple portion of said connection member as well as being fitted to an outer circumferential surface of the nipple portion extending away from the outer circumferential surface of said valve cap.

8. A connection structure according to claim 7, wherein a flow adjustment bore is axially formed in the bottom portion of said valve body in such a manner as to extend through the bottom portion.

9. A valved connection member to be connected with a flexible tube, comprising:
- a cylindrical connection member comprising a cylindrical nipple portion formed at one end and allowing an inner circumferential surface of an end portion of the flexible tube to be fitted thereto;
- a cylindrical valve cap comprising a small-diameter portion and a large-diameter portion, a valve seal surface being formed on an inner circumferential surface of said cylindrical valve cap and located between the small-diameter portion and the large-diameter portion, said cylindrical valve cap being fitted to an end part of the nipple portion of said connection member with the large-diameter portion facing said connection member;
- a valve body comprising a bottom portion having an abutment part to abut the valve seal surface of said valve cap, said valve body being accommodated within the large-diameter portion of said valve cap in such a manner as to be axially slidable; and
- a compression spring disposed between the large-diameter portion of said valve cap and the nipple portion of said connection member and adapted to bias said valve body toward the valve seal surface of said valve cap.

10. A valved connection member according to claim 9, wherein said valve body comprises a sliding portion extending from the bottom portion away from the large-diameter portion of said valve cap and accommodated slidably within the small-diameter portion of said valve body; and a flow path portion provided in the sliding portion and allowing flow of fluid.

11. A valved connection member according to claim 9 or 10, wherein a flow adjustment bore is axially formed in the bottom portion of said valve body in such a manner as to extend through the bottom portion.

12. A valved connection member to be connected with a flexible tube, comprising:
- a cylindrical connection member comprising a cylindrical nipple portion formed at one end and allowing an inner circumferential surface of an end portion of said flexible tube to be fitted thereto; and an annular first end face portion formed at an end part of the nipple portion in such a manner as to face toward the one end and to extend radially;
- a cylindrical valve cap comprising a small-diameter portion and a large-diameter portion, an axial bore formed in the small-diameter portion being smaller in diameter than an axial bore formed in the large-diameter portion; a valve seat portion having a valve seal surface formed on an inner circumferential surface of said cylindrical valve cap and located between the small-diameter portion and the large-diameter portion; and a fitting end portion formed at one end of the large-diameter portion away from the small-diameter portion and fitted to an outer circumferential surface of the end part of the nipple portion of said connection member;
- a cylindrical valve body comprising a bottom portion having an abutment part to abut the valve seal surface of said valve cap; a cylindrical open end portion extending from the bottom portion and opening toward the connection member; an annular second end face portion formed at the open end portion in such a manner as to face the first end face portion and to extend radially; a first sliding portion extending radially outward from the open end portion in an integral condition; and a first flow path portion provided in the first sliding portion and allowing flow of fluid; said valve body being accommodated within the large-diameter portion of said valve cap in such a manner as to be axially slidable by virtue of the first sliding portion; and a compression spring disposed between the first end face portion and the second end face portion and adapted to bias said valve body toward the valve seat portion of said valve cap.

13. A valved connection member according to claim 12, wherein said valve body further comprises a second sliding portion extending from the bottom portion away from the open end portion and accommodated slidably within the small-diameter portion of said valve cap; and a second flow path portion formed in the second sliding portion and allowing flow of fluid.

14. A valved connection member according to claim 12 or 13, wherein a flow adjustment bore is axially formed in the bottom portion of said valve body in such a manner as to extend through the bottom portion.

15. A valved connection member to be connected with a flexible tube, comprising:

a cylindrical connection member comprising a cylindrical nipple portion formed at one end and allowing an inner circumferential surface of an end portion of the flexible tube to be fitted thereto; and an annular first end face portion formed at an end part of the nipple portion in such a manner as to face toward the one end and to extend radially;

a cylindrical valve cap comprising a small-diameter portion and a large-diameter portion, an axial bore formed in the small-diameter portion being smaller in diameter than an axial bore formed in the large-diameter portion; a valve seat portion having a valve seal surface formed on an inner circumferential surface of said cylindrical valve cap and located between the small-diameter portion and the large-diameter portion; a first sliding portion extending radially inward from an inner circumferential surface of the large-diameter portion in an integral condition and located in the vicinity of a boundary between the small-diameter portion and the large-diameter portion; a first flow path portion formed in the first sliding portion and allowing flow of fluid; and a fitting end portion formed at one end of the large-diameter portion away from the small-diameter portion and fitted to an outer circumferential surface of the end part of the nipple portion of said connection member;

a cylindrical valve body comprising a bottom portion having an abutment part to abut the valve seal surface of said valve cap; a cylindrical open end portion extending from the bottom portion and opening toward the connection member; and an annular second end face portion formed at the open end portion in such a manner as to face the first end face portion and to extend radially; said valve body being accommodated within the large-diameter portion of said valve cap in such a manner as to be axially slidable by virtue of the first sliding portion; and a compression spring disposed between the first end face portion and the second end face portion and adapted to bias said valve body toward the valve seat portion of said valve cap.

16. A valved connection member according to claim 15, wherein said valve body further comprises a second sliding portion extending from the bottom portion away from the open end portion and accommodated slidably within the small-diameter portion of said valve cap; and a second flow path portion formed in the second sliding portion and allowing flow of fluid.

17. A valved connection member according to claim 15 or 16, wherein a flow adjustment bore is axially formed in the bottom portion of said valve body in such a manner as to extend through the bottom portion.

18. A valved connection member to be connected with a flexible tube, comprising:

a cylindrical connection member comprising a cylindrical nipple portion formed at one end and allowing an inner circumferential surface of an end portion of said flexible tube to be fitted thereto; and an annular first end face portion formed at an end part of the nipple portion in such a manner as to face toward the one end and to extend radially;

a cylindrical valve cap comprising a small-diameter portion and a large-diameter portion, an axial bore formed in the small-diameter portion being smaller in diameter than an axial bore formed in the large-diameter portion; a valve seat portion having a valve seal surface formed on an inner circumferential surface of said cylindrical valve cap and located between the small-diameter portion and the large-diameter portion; and a fitting end portion formed at one end of the large-diameter portion away from the small-diameter portion and fitted to an outer circumferential surface of the end part of the nipple portion of said connection member;

a cylindrical valve body comprising a bottom portion having an abutment part to abut the valve seal surface of said valve cap; a cylindrical open end portion extending from the bottom portion and opening toward the connection member; an annular second end face portion formed at the open end portion in such a manner as to face the first end face portion and to extend radially; a sliding portion extending integrally from the bottom portion away from the open end portion; and a flow path portion provided in the sliding portion and allowing flow of fluid; said valve body being accommodated within said valve cap in such a manner as to be axially slidable by virtue of the sliding portion; and a compression spring disposed between the first end face portion and the second end face portion and adapted to bias said valve body toward the valve seat portion of said valve cap.

19. A valved connection member according to claim 18, wherein a flow adjustment bore is axially formed in the bottom portion of said valve body in such a manner as to extend through the bottom portion.

* * * * *